United States Patent
Ferrario et al.

(10) Patent No.: US 9,136,758 B2
(45) Date of Patent: Sep. 15, 2015

(54) VOLTAGE CONVERTING LED CIRCUIT WITH SWITCHED CAPACITOR NETWORK

(76) Inventors: Bruno Ferrario, San Jose, CA (US);
Yun Tung Sien, San Jose, CA (US);
Xiaofan Chen, legal representative, San Jose, CA (US)

(*) Notice: Subject to any disclaimer, the term of this patent is extended or adjusted under 35 U.S.C. 154(b) by 90 days.

(21) Appl. No.: 12/611,870

(22) Filed: Nov. 3, 2009

(65) Prior Publication Data

US 2014/0191740 A1    Jul. 10, 2014

(51) Int. Cl.
| | |
|---|---|
| *G05F 1/56* | (2006.01) |
| *H02M 3/156* | (2006.01) |
| *H05B 33/08* | (2006.01) |
| *H02M 1/36* | (2007.01) |

(52) U.S. Cl.
CPC ............... *H02M 3/156* (2013.01); *H02M 1/36* (2013.01); *H05B 33/086* (2013.01); *H05B 33/0815* (2013.01)

(58) Field of Classification Search
USPC .................................................. 323/282–290
See application file for complete search history.

(56) References Cited

U.S. PATENT DOCUMENTS

| | | | |
|---|---|---|---|
| 7,710,092 B2* | 5/2010 | Chapuis et al. | 323/282 |
| 7,743,266 B2* | 6/2010 | Chapuis | 713/300 |
| 2009/0237048 A1* | 9/2009 | Hou et al. | 323/282 |
| 2010/0033146 A1* | 2/2010 | Irissou et al. | 323/282 |
| 2010/0327835 A1* | 12/2010 | Archibald | 323/282 |

* cited by examiner

*Primary Examiner* — Adolf Berhane
*Assistant Examiner* — Nusrat Quddus
(74) *Attorney, Agent, or Firm* — Lando & Anastasi, LLP

(57) ABSTRACT

A Voltage Converting LED Circuit with Switched Capacitor Network contains a 2-way MOSFET switch that connects a capacitor network to the output of an error amplifier, thereby enabling the error amplifier to resume operation quickly after the off-time segment of a PWM cycle. The switch is controlled synchronously with current sinks controlling brightness and color levels. In a preferred embodiment, multiple serially connected strings of LED's can be controlled simultaneously via one switch.

18 Claims, 4 Drawing Sheets

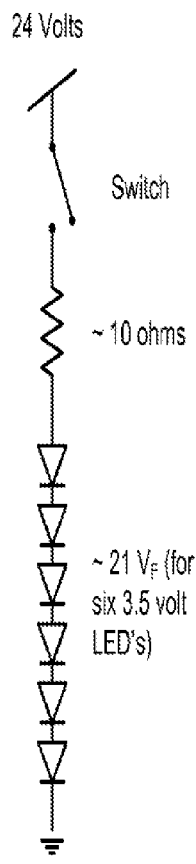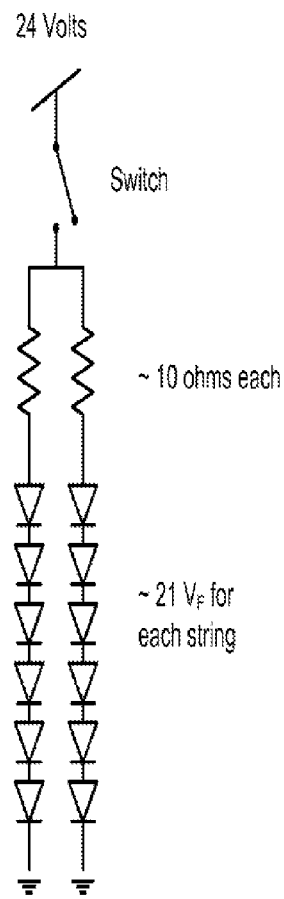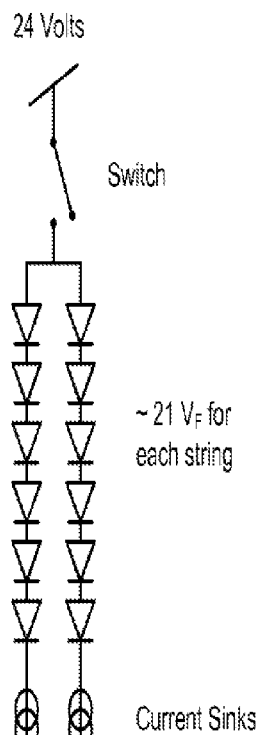

VOLTAGE CONVERTING LED CIRCUIT WITH SWITCHED CAPACITOR NETWORK

RELATED APPLICATIONS

This application is related to the subject matter of a concurrently filed application entitled "Multiple Chip Voltage Feedback Technique for Driving LED's." The disclosure of the concurrently filed application is incorporated in this application by reference.

BACKGROUND OF THE INVENTION

Current LCD screens with white LED backlight technology use a variety of configurations of the LED backlights. In these devices, the color of the picture is generated by opening and closing the LCD's; the brightness of the picture is provided from the LED backlight.

In these screens, there is more than one method of controlling the brightness of these screens that a human observer perceives. For example, some devices control the current that flows through the LED's, as more current through a LED tends to make the LED brighter. The downside of this method is that altering the current through an LED skews the color spectrum that the LED produces, making the expected white color warmer or cooler.

An alternate method is to cycle the LED's on and off at a rate that is too high for the human eye to perceive, but to maintain a constant current through the LED's while they are on. This PWM algorithm controls the brightness by controlled the fraction of time that the LED's are producing light; the higher the percentage of time that the LED's are on, the brighter the display appears. For example, an LED might have a constant PWM frequency of 1000 hertz, and for each of those 1 millisecond PWM cycles, it might be on for 100 of the 1000 microseconds of that cycle; such an LED would be said to have a duty cycle of 10%. Since the current is constant during the 10% of the time that the LED is on, the color spectrum produced by the LED remains constant.

Consider FIG. 1: a serially wired string of a switch, a resistor and six LED's with forward voltages of about 3.5 volts each, wired to a 24 volt power supply. When the switch allows current to flow, the resistor and the forward voltages of the six LED's will define the current, and that current will not change as the frequency of the switching increases or decreases. In the drawing, with a "perfect" 10.0 ohm resistor and a string of six "perfect" LED's with forward voltages of 3.5 volts each—21 volts total—the amount of current would 0.3 amps. (The voltage across the resistor is 24−21=3 volts; using Ohm's law, the current is 3 volts/10 ohms, or 0.3 amps.)

However, manufacturing variations invariably result in imperfect parts. Consider the case where the resistor is 10.3 ohms rather than 10.0 ohms, while the forward voltage of the string of LED's is 22 volts rather than 21 volts. In this revised example, the current is 2 volts/10.3 ohms, or 0.194 amps, very different from the 0.3 amps "perfect case."

A small LED backlit display, such as that of a small television, might contain two such identical strings of serially connected LED's that share the same switch such as is illustrated in FIG. 2. In this television, manufacturing variation in the production of the resistors and the LED's would lead to different sides of the television having different brightnesses and different color spectra because the current through each string is not managed—it is set passively by each string's combination of resistor and LED's.

In the case of this television, a more sophisticated method of controlling the current that passes through the LED's is needed. If, as in FIG. 3, the resistors are replaced by current sinks, the amount of current can be controlled in each of the two strings, and the brightness and color spectra of the strings made equal. (The current sinks and the switch must be synchronously controlled such that the current sinks are active only when the switch is passing current.) In this example, the PWM timings of the switch will control the perceived brightness of the LED's, while the current sinks will stabilize the color spectrum at the desired level by controlling the flow of current through each string and keeping the two currents the same.

Problems start to arise when the voltage produced by the power supply inadequately matches the sum of the voltages required by the current sinks and the strings of LED's—the supplied voltage might be too high or too low. For example, 24 volt power supplies are common in LCD televisions, but a string of 8 LED's, each with a forward voltage of about 3.5 volts, would require a higher voltage in order to operate efficiently. A string of 3 or 4 LED's, on the other hand, would require a lower voltage to operate well.

Because efficiency is a major requirement, it is desirable to introduce a switching regulator—either a boost converter that regulates the voltage upwards, or a Buck converter that regulates the voltage downwards—into the circuit. This introduction brings with it a new problem.

Consider FIG. 4, in which boost converter circuitry has been introduced to raise the voltage from the input power source to the single string of LED's. What is desired is a boosted voltage that is high enough to run to both the strings of LED's and the current sink, but low enough to maintain efficiency. Because each manufactured LED has a variable forward voltage, each manufactured circuit's optimal voltage will be different.

In this simple circuit, the Driver Logic Module controls the switching that surrounds the inductor, while the error amplifier ensures that there's enough voltage left on the string—after the LED's forward voltages take their share—to run the current sink. If the measured voltage at the point between the LED's and the current sink is too low, the feedback mechanism controlled by the error amplifier will attempt to raise the voltage produced by the controller by allowing the inductor to charge for a longer period of time before it is discharged through the LED's.

This straightforward solution works well when the LED's and the current sinks are generally on or off, when the fraction of time that it takes the boost converter to supply the optimal voltage from an OFF state is negligible or not noticeable as compared to the time that the LED strings are actually on. When the circuit of FIG. 4 starts from an off state and turns the LED's on, it can take the error amplifier quite a bit of time to find the proper timing required of the inductor switch in order to provide that optimal voltage. Because the voltage at the output of the error amplifier directly controls the peak current that runs into the converter, a starting state where the voltage has been artificially driven to an incorrect level will require the error amplifier to "hunt around" as it endeavors to bring order to the circuit.

This solution does not work well when the LED strings are pulsed ON and OFF at high PWM frequencies. As before, this high frequency PWM is desirable because it varies the brightness of the LED strings by combining "light times" and "dark times" in each PWM cycle. What is a desired is a system that supports a high PWM rate while, at the same time, regulates current such that there is no noticeable variation during the startup period in which the boost converter might experience large load transients. The higher the PWM frequency, the less acceptable these transients become.

For example, consider a system in which the desired PWM rate is not 1 hertz but rather 1,000 hertz. If, during each 1000 microsecond PWM cycle, the error amplifier takes 100 microseconds to adapt, the unwanted behavior would occur for 100,000 microseconds of each second—10% of the total time!

SUMMARY OF THE INVENTION

The current invention uses a switched capacitor network to allow faster startup times when the load is turned on at the beginning of each PWM cycle. FIG. 5 shows the use of the switched compensation sub-circuit in a basic boost configuration with one serially wired string comprising a current sink and a series of LED's. The switch $S_{comp}$ is wired into the output of the error amplifier, and isolates the compensation circuit, shown in this case to comprise a capacitor $C_{comp}$ and a resistor $R_{comp}$. Other compensation circuit configurations would be isolated in the same fashion.

During the first cycle in which the circuit is turned on and the LED's produce light, the switch is configured to connect the compensation sub-circuit with the rest of the circuit. As the error amplifier adjusts its output in order to regulate the boost converter into supplying an adequate voltage to the current sinks, the compensation capacitor adjusts as well, and as the error amplifier stabilizes, the compensation capacitor does so as well.

After one PWM cycle of the LED's, the Backlight PWM On/Off Control module dictates that the circuit should "turn off" for a small amount of time. The Driver Logic module then regulates the converter's output voltage to some high voltage within the Overvoltage Protection limit, turns the current sink off, and disconnects the compensation sub-circuit.

When the load is turned ON for the next PWM cycle, the reconnection of the capacitor to the network allows the error amplifier to be closely biased to its "final state", resulting a much quicker startup time.

The invention can be extended in a number of different ways. For example, the boost converter shown, consisting of one MOSFET switch and a diode, could be changed to a boost converter comprising two switches. If the voltage from the power supply is higher than the voltage demanded by the LED's and the current sink, the converter could be voltage reducing converter rather than a voltage increasing converter. And, if the end application consisted of more than one string of LED's, the error amplifier could comprise more than one positive inputs, and ensure that each current sink was receiving a proper amount of voltage in order to function.

BRIEF DESCRIPTION OF THE DRAWINGS

FIG. 1 is a schematic circuit diagram of a switched 24 volt power supply supplying current through a single serially connected string comprising a resistor and six LED's.

FIG. 2 is a schematic circuit diagram of a switched 24 volt power supply supplying current through two serially connected strings, each comprising a resistor and six LED's.

FIG. 3 is a schematic circuit diagram of a switched 24 volt power supply supplying current through two serially connected strings, each comprising a current sink and six LED's.

DETAILED DESCRIPTION OF THE PREFERRED EMBODIMENTS

Figure 4:
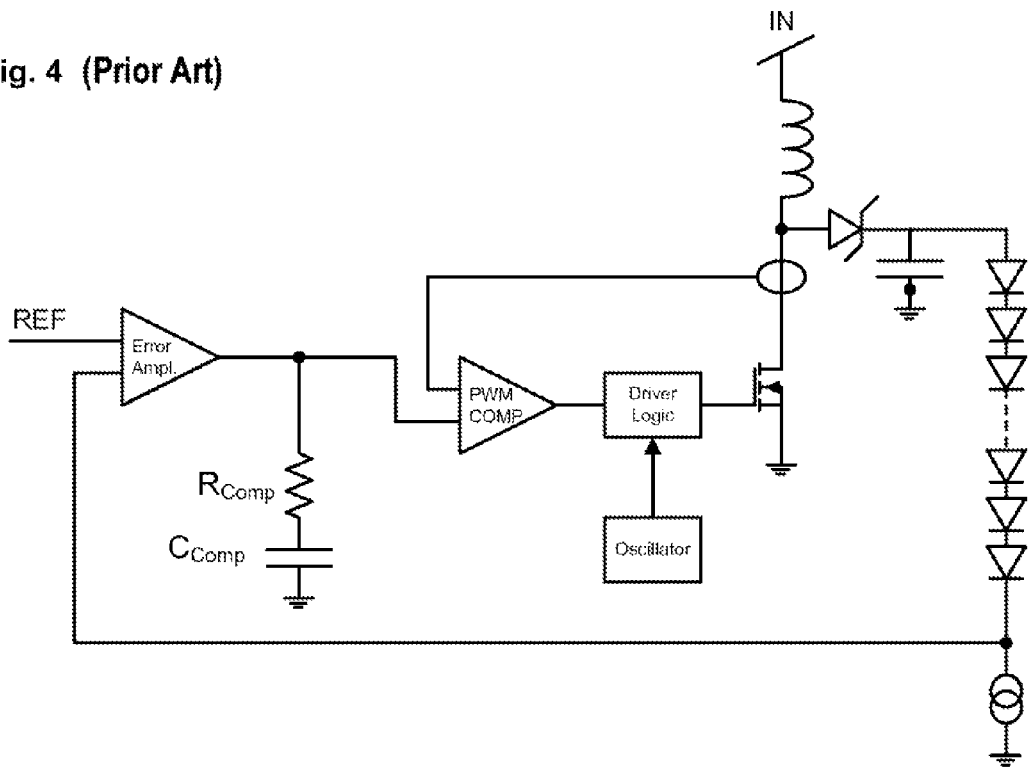
FIG. 4 is a schematic circuit diagram of a prior art circuit comprising a power supply providing current via a boost converter through a single serially connected string comprising a resistor and a number of LED's, wherein the boost converter is controlled via an error amplifier and a feedback mechanism.
Figure 5:
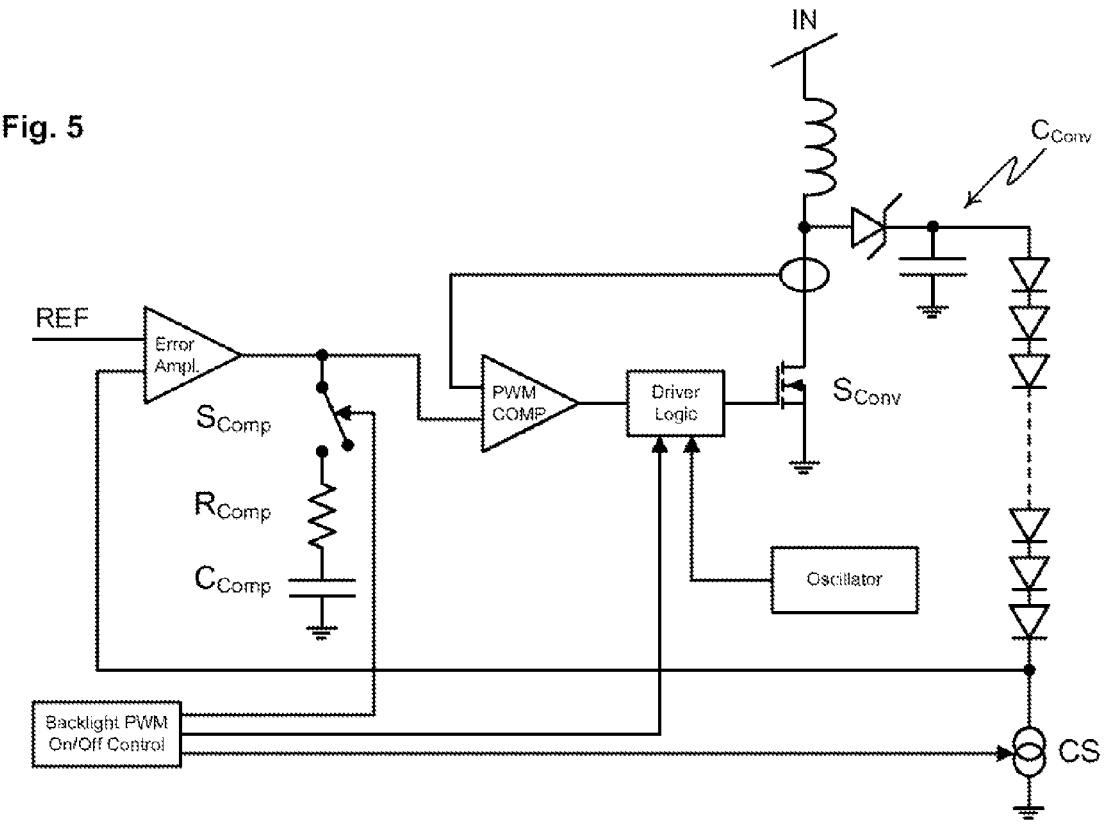
FIG. 5 is a schematic circuit diagram of a first embodiment according to this invention wherein the error amplifier output is frozen via the disconnection of the compensation sub-circuit from the remainder of the circuit when the circuit is turned off.

FIG. 5 shows a circuit that is a preferred embodiment of the invention. This circuit could be found inside a one-LED-string television together with a power supply that produces a voltage lower than is required to operate the string of LED's. In this particular embodiment, the voltage from the power supply is stepped up in order to operate the string of LED's. The circuit comprises five general parts: the boost converter, the LED channel that comprises the LED string and the current sink, the error amplifier, and the switched capacitor network. Central to this embodiment of the invention is the backlight PWM control, but as is the case with the power supply, the exact control mechanism is external to the claimed invention.

The boost converter comprises the inductor, the switch marked $S_{Conv}$, the capacitor marked $C_{Conv}$, the diode, the driver logic module, the oscillator, the current measuring device, and the PWM comparator. All of these units function together, converting the voltage from the power supply into the higher voltage that is required to run the LED channel. This particular boost converter in this embodiment contains three inputs and one output that are relevant to the invention. The first input is the unaltered output from the power supply, and is the primary source of power for the LED channel. The output of the boost converter supplies the altered, stepped-up voltage to the LED channel.

The two remaining relevant inputs are control inputs. The first of these control inputs is connected to the backlight PWM control. When the television—through the backlight PWM control—switches the backlight off, the backlight PWM control switches the boost converter off by passing a signal or set of signals to the driver logic module of the boost converter. The second control input is the feedback from the error amplifier. It is this control signal that alters the operation of the boost converter in order to produce the correct voltage for the LED channel.

Within the boost converter, the Driver Logic module controls the timing of the boost converter switch. When the oscillator triggers, $S_{CONV}$ becomes conducting, and an increasing current flows from the power supply, through the inductor, to ground. The PWM comparator compares this current as it flows through the current measuring device to the "desired current" output from the error amplifier, and when the flowing current is high enough, the switch $S_{Conv}$ is reversed, and it stops conducting. At that point, the flowing current is then directed through the diode, past the capacitor, and then through the LED channel, producing the backlight. When the oscillator triggers again, the process is repeated.

The LED channel comprises the string of LED's (10 LED's in this case, with an average forward voltage of 3.5 volts each) and the current sink that requires 1.0 volts to function. This channel forms the simple one-channel backlight for the television, and in this embodiment, requires approximately 36.0 volts to operate. The required voltage is approximate because the forward voltages across each of the ten LED's can vary for at least two reasons: the manufacturing process of the LED's introduces variations into the actual forward voltages, and the sorting process that organizes individual LED's into this one, ten LED string can affect the total forward voltage of all of the LED's. The only known value is the voltage required across the current sink, and it is this voltage that is measured.

The error amplifier takes a reference voltage generated by the enclosing television (indicated by the REF input in FIG. 5) and compares it to this measured voltage across the current sink. It is important to note that it is this measured voltage that must be maintained at a voltage equal to or slightly higher than the reference voltage—it is not the voltage across the entire channel that is monitored. As the voltage sensed across the current sink varies, the error amplifier alters its output voltage (connected to the PWM comparator) in order to find the correct output voltage that results in boost converter timing that in turn results in the minimally sufficient voltage across the current sink.

The switched capacitor network comprises the switch marked $S_{Comp}$, the capacitor marked $C_{Comp}$, and the resistor marked $R_{Comp}$. The switch connects the capacitor and the resistor to the remainder of the circuit. The capacitor and the resistor could be reversed in this sub-circuit, with no ill effect, or they could be replaced with a different network of capacitors and resistors that might have different characteristics. The only characteristic of interest is that the voltages on both sides of the switch can be equalized and then disconnected from each other. It is the disconnection and reconnection of this switched capacitor network from the output of the error amplifier that allows the circuit as a whole to come to equilibrium much more quickly than would otherwise be possible.

Controlling the circuit as a whole, the backlight PWM control is operated by the enclosing television. In this embodiment, it is an integrated circuit without built-in PWM functionality (which is found elsewhere in the television) but it is possible, and might be desirable in some situations, to build this or other functionality into the backlight PWM control itself. The backlight PWM control in turn operates the different components of the remainder of this embodiment. As it takes commands from the television to turn the string of LED's on and off at a rapid rate, it in turn switches the remainder of the components on and off. It uses the switch $S_{comp}$ to connect and disconnect the compensation capacitor network from the remainder of the circuit. It also turns the current sink (marked CS) on and off in order to cycle the LED's on and off, and it disables the operation of the boost converter via the driver logic module.

Figure 6:
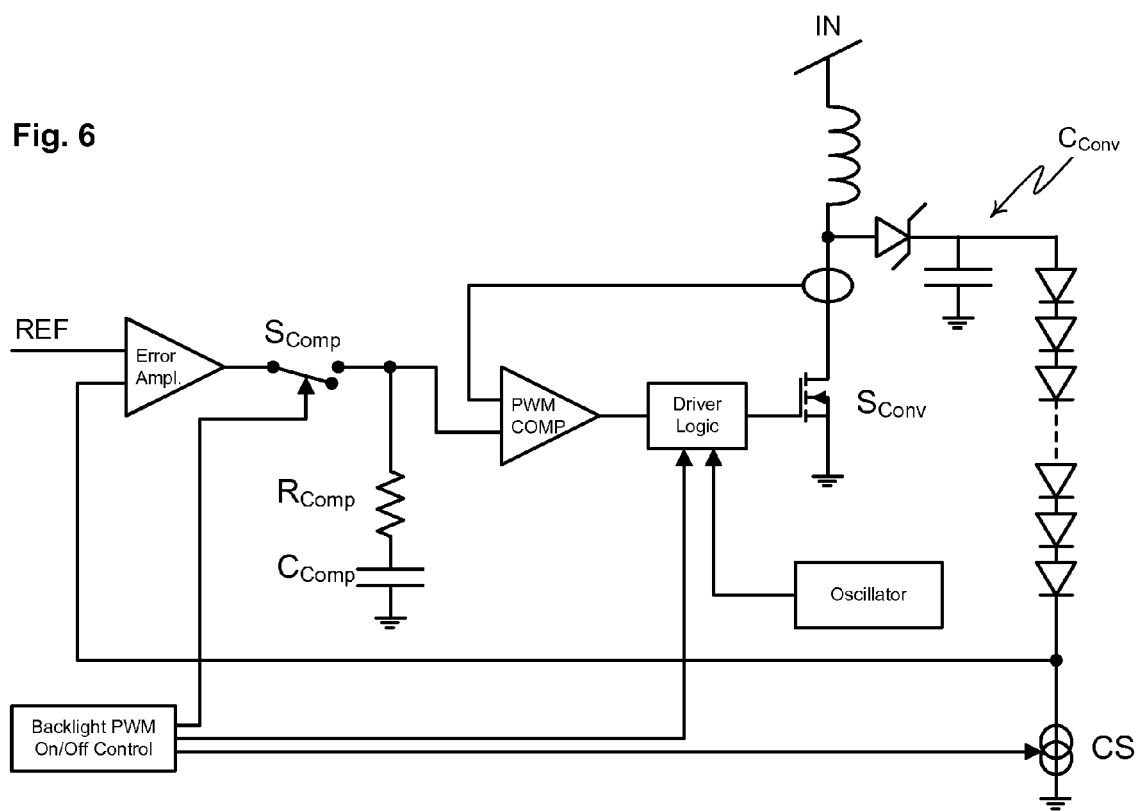
FIG. 6 is a schematic circuit diagram of a second embodiment according to this invention wherein the error amplifier output is frozen via the disconnection of the error amplifier output from remainder of the circuit and the compensation sub-circuit when the circuit is turned off.

FIG. 6 shows a similar embodiment to that shown in FIG. 5, but with a different configuration of the switch. In FIG. 6, the output of the error amplifier is disconnected from the compensation capacitor network and the remainder of the circuit by the switch.

Figure 7:
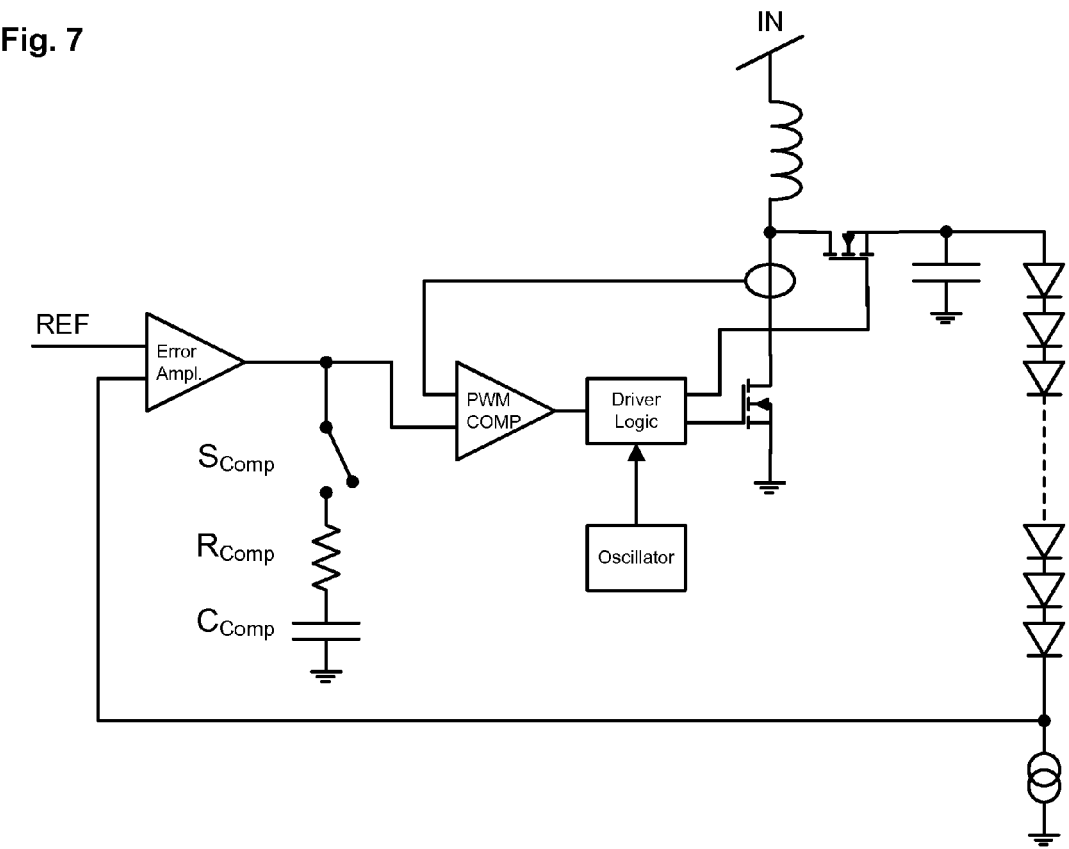
FIG. 7 is a schematic circuit diagram of a third embodiment according to this invention wherein the boost converter is constructed differently.

FIG. 7 shows a similar embodiment to that shown in FIG. 5, but with a different configuration of the boost converter. (In FIGS. 7, 8, and 9, the Backlight PWM On/Off control section has been omitted for simplicity.)

Figure 8:
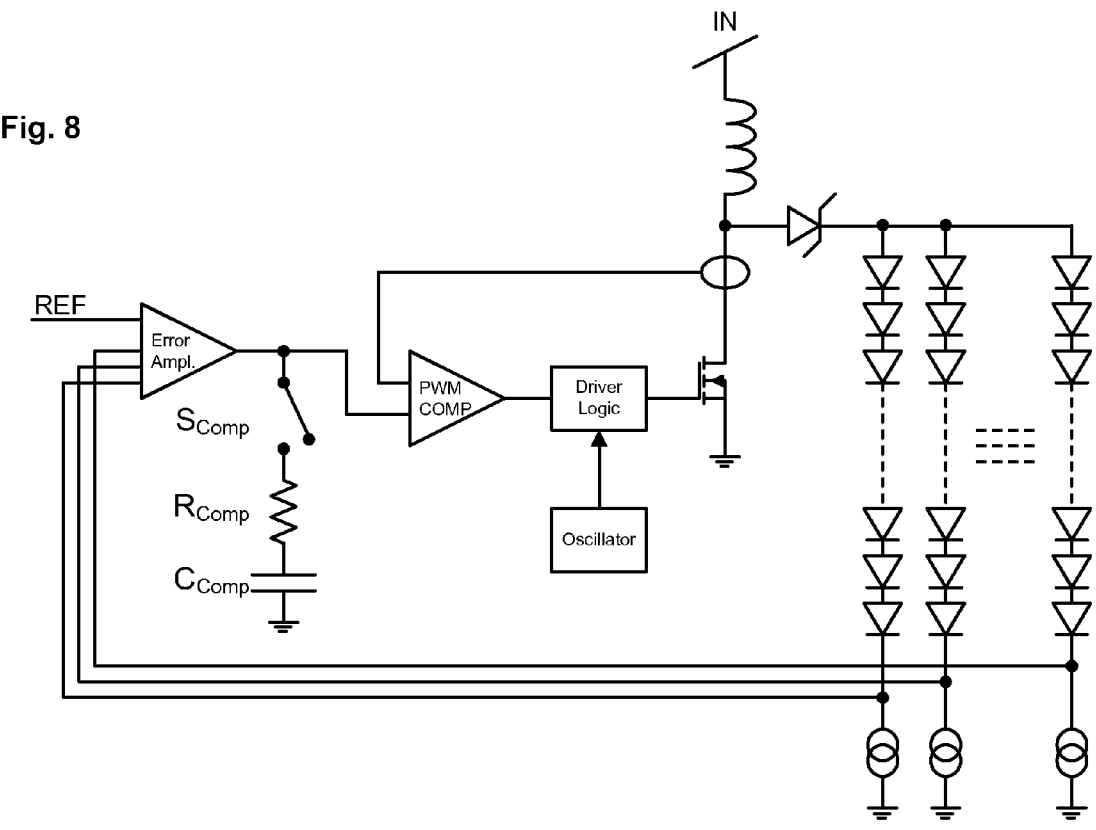
FIG. 8 is a schematic circuit diagram of a fourth embodiment according to this invention wherein the more than one string of LED's is examined for feedback results.

FIG. 8 shows an embodiment in which multiple strings of LED's are controlled. In this case, the error amplifier must ensure that each current sink has a sufficient voltage in order to function, and it can do so by selecting the lowest voltage from amongst the various strings for comparison with the reference voltage.

Figure 9:
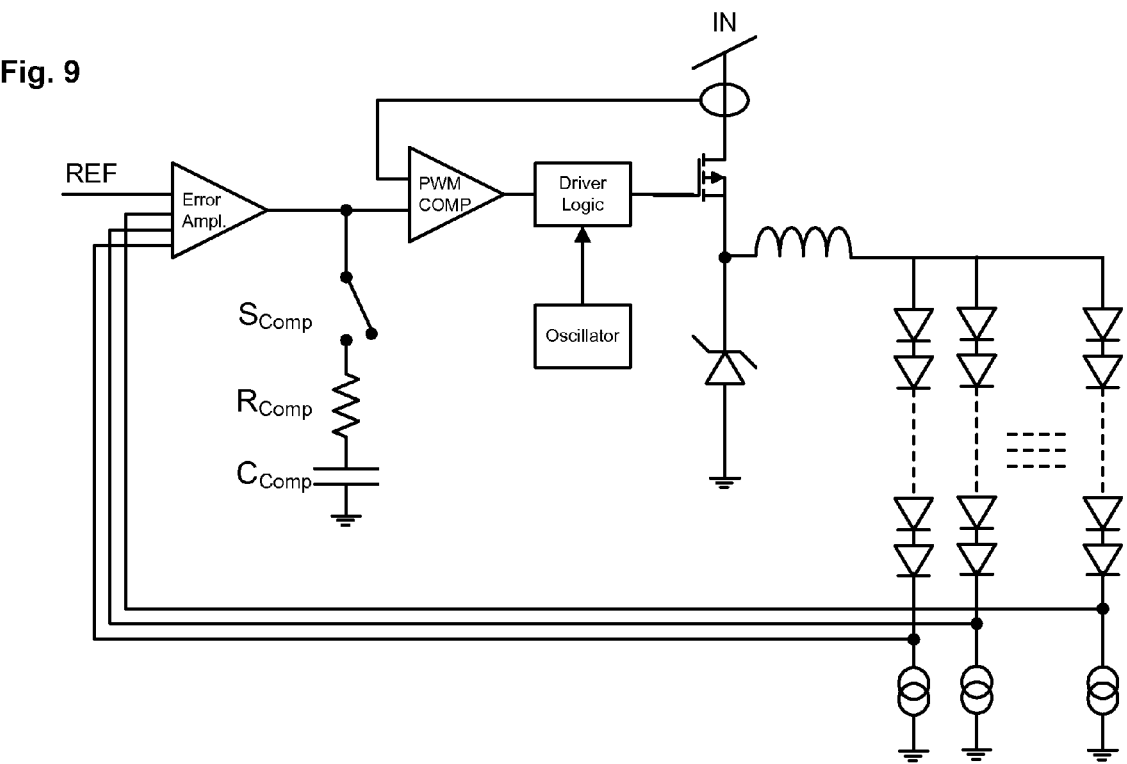
FIG. 9 is a schematic circuit diagram of a fifth embodiment according to this invention wherein a voltage reducing converter is used rather than a boost converter.

FIG. 9 shows an embodiment that is similar to the multiple string embodiment of FIG. 8, except that FIG. 9 uses a voltage reducing converter rather than a boost converter to adjust the input voltage for the LED strings. The feedback mechanism—ensuring that there is sufficient voltage to power all of the current sinks—remains the same.

What is claimed is:

1. A circuit comprising:
   a DC-DC voltage converter having a first input to receive a DC voltage, a second input to receive a modulating control signal having at least a first state and a second state, and an output to supply a variable output voltage to a load, the DC-DC voltage converter constructed to supply the variable output voltage to the load during the first state and to stop supplying the variable output voltage to the load during the second state;
   an operational amplifier having a first input to receive a voltage reference, a second input to receive a feedback voltage from the load, and an output;
   a compensation RC network including at least one resistor and at least one capacitor; and
   a switch, coupled to the compensation RC network, constructed to receive the modulating control signal, connect the compensation RC network to the output of the operational amplifier during the first state, and disconnect the compensation RC network to the output of the operational amplifier during the second state.

2. The circuit of claim 1 wherein the DC-DC voltage converter is a boost converter.

3. The circuit of claim 2 wherein the DC-DC voltage converter includes a first MOSFET switch coupled in series with an inductor between the first input of the DC-DC voltage converter and ground.

4. The circuit of claim 3 wherein the DC-DC voltage converter further includes a second MOSFET switch having a first terminal coupled to the inductor and the first MOSFET switch and a second terminal coupled to the output of the DC-DC converter.

5. The circuit of claim 1 wherein the DC-DC voltage converter is a buck converter.

6. The circuit of claim 5 wherein the DC-DC voltage converter includes a MOSFET switch coupled in series with a diode between the first input of the DC-DC voltage converter and ground.

7. The circuit of claim 1 further comprising a comparator having a first input coupled to the output of the operational amplifier and a second input to receive a measurement of a magnitude of current between the first input of the DC-DC voltage converter and ground.

8. The circuit of claim 7 wherein the DC-DC voltage converter is one of a boost converter and a buck converter.

9. The circuit of claim 7 wherein the DC-DC voltage converter includes an inductor and is constructed to control a magnitude of current in the inductor based on the output of the operational amplifier.

10. A method of regulating an output voltage of a DC-DC voltage converter provided to a load, the method comprising:
    monitoring a voltage level associated with the load;
    determining, by an operational amplifier, a difference between a reference voltage and the voltage level;

receiving a modulating control signal having at least a first state and a second state;

regulating the output voltage of the DC-DC converter provided to the load based on at least the difference between the reference voltage and the voltage level during the first state;

stopping regulation of the output voltage of the DC-DC converter provided to the load based on at least the difference between the reference voltage and the voltage level during the second state;

connecting an output of the operational amplifier to a compensation RC network including at least one resistor and at least one capacitor during the first state; and disconnecting the output of the operational amplifier to the compensation RC network during the second state.

11. The method of claim 10 wherein the DC-DC converter is one of a boost converter and a buck converter.

12. The method of claim 10 further comprising controlling a magnitude of current in an inductor of the DC-DC voltage converter based on the difference between the reference voltage and the voltage level.

13. The circuit of claim 1 wherein the load includes at least one LED string.

14. The circuit of claim 13 wherein the at least one LED string includes a first LED string and a second LED string each having a first end and a second end, the first end of the first LED string and the second LED string being coupled to the output of the DC-DC voltage converter.

15. The circuit of claim 14 wherein the operational amplifier has a third input, the second end of the first LED string is coupled to the second input of the operational amplifier, and the second end of the second LED string is coupled to the third input of the operational amplifier.

16. The circuit of claim 3 wherein the DC-DC voltage converter further includes a diode having an anode coupled to the inductor and the first MOSFET switch and a cathode coupled to the output of the DC-DC converter.

17. The circuit of claim 6 wherein the DC-DC voltage converter further includes an inductor having a first end coupled to the diode and the MOSFET switch and a second end coupled to the output of the DC-DC converter.

18. The circuit of claim 1 wherein the compensation RC network has a first end coupled to the switch and a second end coupled to ground.

* * * * *